United States Patent [19]

Clarke et al.

[11] Patent Number: 4,904,394
[45] Date of Patent: Feb. 27, 1990

[54] METHOD FOR SELECTIVE FILTERING OF A FLUID USING POROUS PIEZOELECTRIC MATERIAL

[75] Inventors: David J. Clarke; Barrie C. Blake-Coleman, both of Salisbury, England

[73] Assignee: Public Health Laboratory Service Board, London, United Kingdom

[21] Appl. No.: 10,888

[22] PCT Filed: Jun. 11, 1986

[86] PCT No.: PCT/GB86/00334

§ 371 Date: Apr. 1, 1987

§ 102(e) Date: Apr. 1, 1987

[87] PCT Pub. No.: WO86/07284

PCT Pub. Date: Dec. 18, 1986

[51] Int. Cl.⁴ .................. B01D 33/00; B01D 35/20
[52] U.S. Cl. ........................... 210/739; 210/748; 210/780; 209/269; 209/363
[58] Field of Search ............ 210/745, 739, 748, 780, 210/785, 500.42, 388, 446; 209/273, 391, 269, 392, 268, 363; 530/414; 435/261, 173

[56] References Cited

U.S. PATENT DOCUMENTS

| | | |
|---|---|---|
| 3,517,811 | 6/1970 | Newfarmer . |
| 4,253,962 | 3/1981 | Thompson .................. 210/414 |
| 4,279,751 | 7/1981 | Fishgal ........................ 210/388 |
| 4,352,570 | 10/1982 | Firth .......................... 241/175 |

FOREIGN PATENT DOCUMENTS

| | | |
|---|---|---|
| 627618 | 5/1963 | Belgium . |
| 689200 | 4/1967 | Belgium . |
| 2653874 | 6/1978 | Fed. Rep. of Germany . |
| 8203568 | 10/1982 | World Int. Prop. O. . |

OTHER PUBLICATIONS

Chem. Abstracts vol. 69, 1968 p. 6413 abstract No. 68529j and SU, A, 217765 (5/7/68).
Chem. Abstracts vol. 96, No. 2, 1/11/82 Benzinger et al "Development of non-fouling piezoelectric U.F. membranes" p. 316 no. 11455k.
Patent Abst of Japan vol. 100 No. 12 (3/19/84) abstract no. 870174a.
Patent Abst of Japan vol. 7 No. 281 (12/15/83), JP, A, 58159811 (9/22/83).

*Primary Examiner*—W. Gary Jones
*Assistant Examiner*—Coreen Y. Lee
*Attorney, Agent, or Firm*—Lowe, Price, LeBlanc, Becker & Shur

[57] ABSTRACT

A filter which is particularly useful with biological material is formed of porous piezoelectric material such as PZT or Polyvinylidene fluoride. By an application of a voltage to the piezoelectric material, the filter body is caused to vibrate so as to inhibit fouling. In a modification, the piezoelectric material is not itself porous but is bonded to a filter membrane such that vibrations of the piezoelectric material are transmitted to the membrane. Through suitable control of the vibration, the selectivity of the filter can be controlled. In other modifications the vibratory movement of the filter membrane can be produced in other ways such as electro-mechanically.

3 Claims, 4 Drawing Sheets

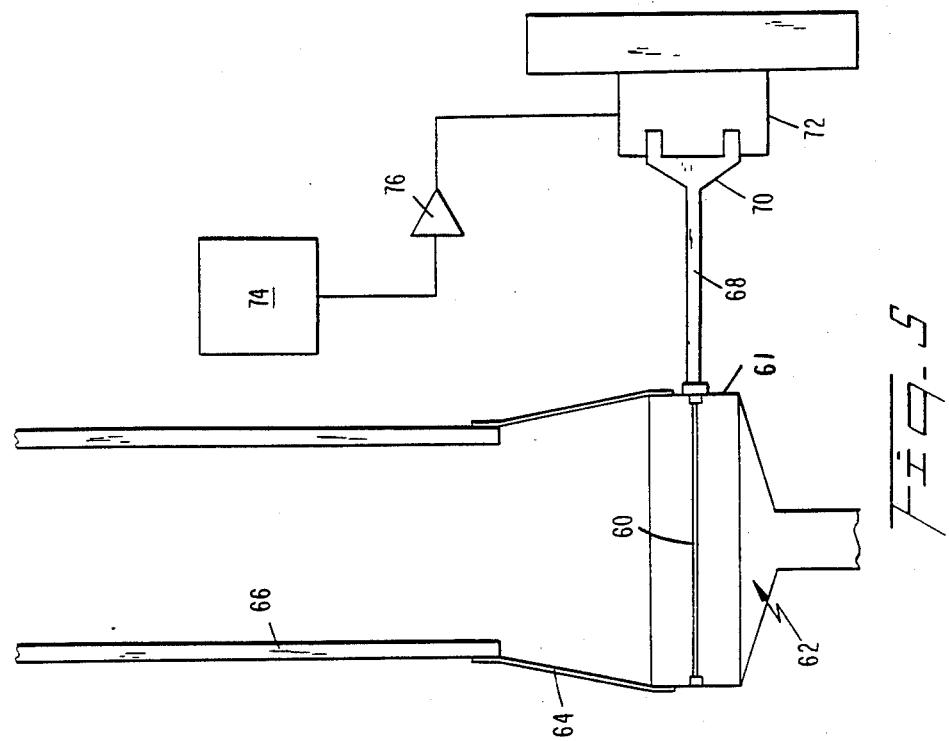
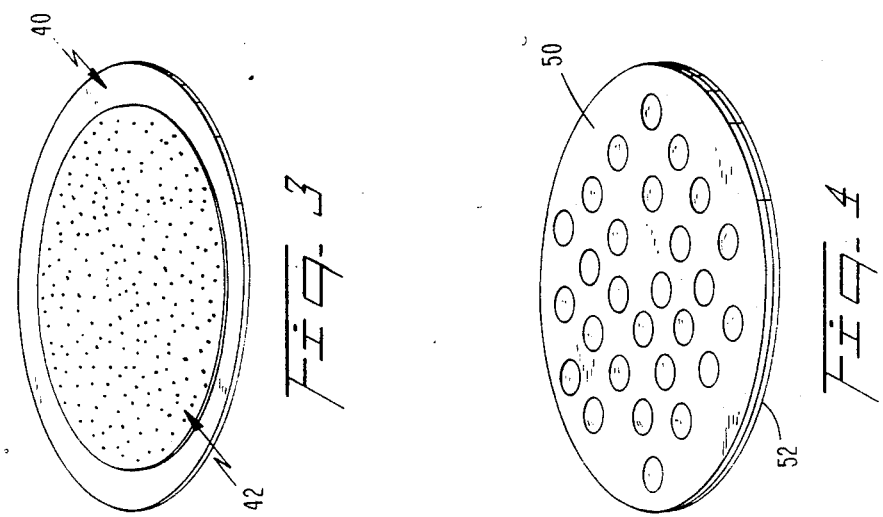

METHOD FOR SELECTIVE FILTERING OF A FLUID USING POROUS PIEZOELECTRIC MATERIAL

BACKGROUND OF THE INVENTION

This invention relates to filters and in the more important example to microporous filters capable of separating micron sized particles such as microorganisms and ultrafiltration membranes capable of retaining macromolecules such as proteins. The invention also relates to methods of filtering.

Filters are presently constructed of polymers (such as cellulose derivatives, teflon and nylon), ceramics, metals (for example stainless steel) and metal oxides (for example aluminium). It has been proposed (see U.S. Pat. No. 4,279,751) to produce a hydraulic fluid filter element which comprises a body of porous piezoelectric material. An alternating voltage is supplied to metallized surfaces of the body to effect vibration, thereby reducing clogging of the filter and promoting the breakdown of contaminants in the hydraulic fluid.

SUMMARY OF THE INVENTION

In this invention, vibration of the filter body in a direction transverse to the flow of filtrate may be controlled so as selectively to block or pass a size of particle or macromolecule to which the filter body is permeable in the stationary state. For example, a porous pizeoelectric filter body may be permeable, in the stationary state, to two species of macromolecule. For each species, a factor can be identified which is related to the size of the particle or macromolecule and the diffusion coefficient. This factor can be thought of as a measure of transport time across the upper surface of the filter body. If the filter body is vibrated in a direction lying in the surface plane, at a rate which exceeds the factor for a particular species, it will be recognised that entry into the pores of the filter body is impeded. The other species of macromolecule in the example would have a higher factor and at the same frequency of vibration this other species would still be passed by the filter body. In other words, by vibrating the filter body at a particular frequency, selectivity will be exhibited in favour of species having a higher factor, these being generally smaller species.

It is believed that to maximise this selectivity effect, the amplitude of vibration should be relatively low and, in the preferred form, about twice the pore dimension. It is believed that the wider range of 0.5 to 10 times the pore dimension will also exhibit useful effects.

Preferably, the surface of the filter body opposing the sample to be filtered is planar and relatively smooth so that shear is maximised and the production of pressure waves causing the fluid and particular species to move with the membrane is minimised.

In a filter according to this invention comprising a body of porous piezoelectric material, the vibratory motion of the filter body will be determined not only by the applied voltage and the physical properties of the body but also by process parameters such as the viscosity and density of both the suspension and the medium and flow characteristics including the flow rate through the filter and, in the case of a cross-flow arrangement, across the filter. It is a further object of this invention to provide an improved filter means capable of providing information concerning the filtration process.

Accordingly, the present invention consists in yet a further aspect in filter or analysis means comprising a body of porous piezoelectric material which may be exposed to a solution or suspension in liquid medium so at least the medium permeates the pores of the body, electrode means associated with the body, means for applying a periodic voltage to the electrode means to cause vibration of the body and means for monitoring the vibratory movement of the body.

Information concerning the filtration process obtained in the above manner or by use of other techniques such as light scattering analysis of the filtrate, can be used in feedback to control the filtration process. Thus, for example, where it is desired to exhibit selectivity in favour of a particular species, the regime of amplitude and frequency of vibration applied to the filter body can be continuously controlled to ensure the selectivity is maintained despite variations in other process parameters. It may be, for example, that there remains a residual low level of fouling. In an alternative approach, the vibration applied to the filter body can be controlled so as to provide that degree of fouling which is necessary to produce the required selectivity. The level of fouling can be detected by any of the methods mentioned or simply by measuring total fluid flow or fluid pressure differential across the filter body. In this form of the invention, the species which provide the required level of fouling can be amongst those ordinarily present in the sample to be filtered. Alternatively, retainable inert particles, such as polystyrene beads, can be specially added to the sample to be filtered to provide a more generally applicable form of the technique. In yet a further form of the invention, the degree of fouling can be controlled by modification of the surface charge of the filter body as mentioned above.

There is a wide variety of materials that are potentially suitable for use in this method. The preferred materials are manmade ceramic piezoelectric materials such as lead zirconate titanate and piezoelectric polymer materials. Ceramic piezoelectric materials are formed by sintering at high temperatures and pressures. By suitable control of the sintering process, pores can be provided which communicate internally of the material to produce filtrate passageways extending through the material. Indeed, the technique of producing filters by sintering of electrically "inert" ceramics is already known.

A number of polymer materials are known to exhibit piezoelectric effects, examples being polytrifluoroethylene and polyvinylchloride (both plasticised and rigid). The preferred piezoelectric polymer material for the present invention is polyvinylidene fluoride for the reason that this is susceptible to relatively high levels of poling. Piezoelectric polymeric materials can be rendered suitably porous by a number of means, the techniques again being known in connection with electrically inert materials. Polymers can, in one method, be dissolved in organic solvents and combined with a non-miscible solvent to form a microemulsion which is thinly layered on to a surface and subjected to controlled evaporation to provide network of microscopic pores. An alternative method uses a high energy beam of radiation or a high voltage electric arc to introduce precise microscopic faults into the material, which faults are then etched away as necessary to produce highly defined pores. These two methods tend to be used for producing microporous filters. Ultra-filtration membranes usually rely for their porosity on the arrangement of the polymer lattices themselves or on chemical cross-linking between polymer chains.

This invention will now be described by way of example with reference to the accompanying drawings in which.

Figure 2:
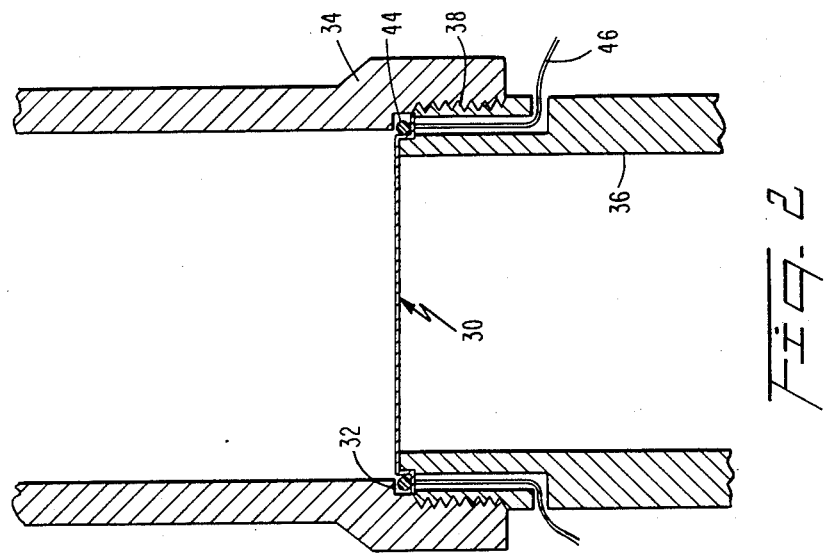
FIG. 2 is a view similar to FIG. 1 showing alternative filtering apparatus according to this invention.
Figure 7:
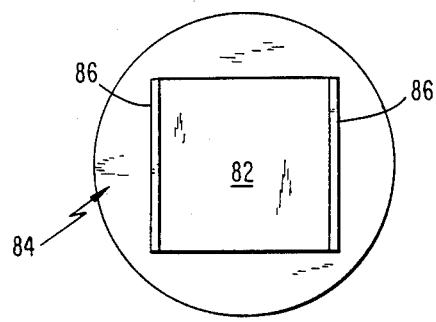
Figure 6:
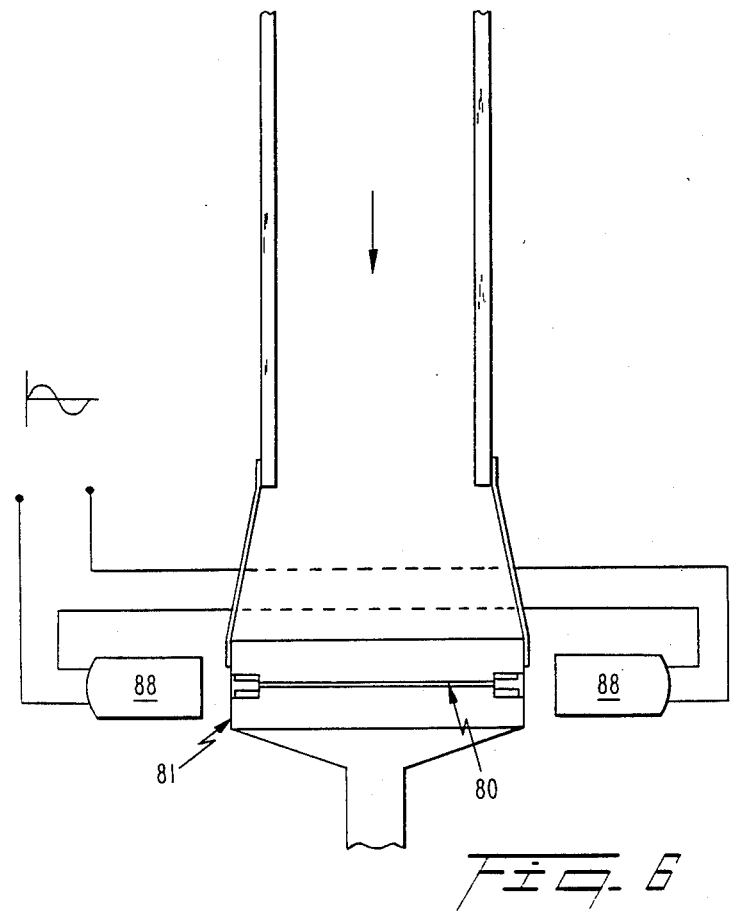
Figure 8:
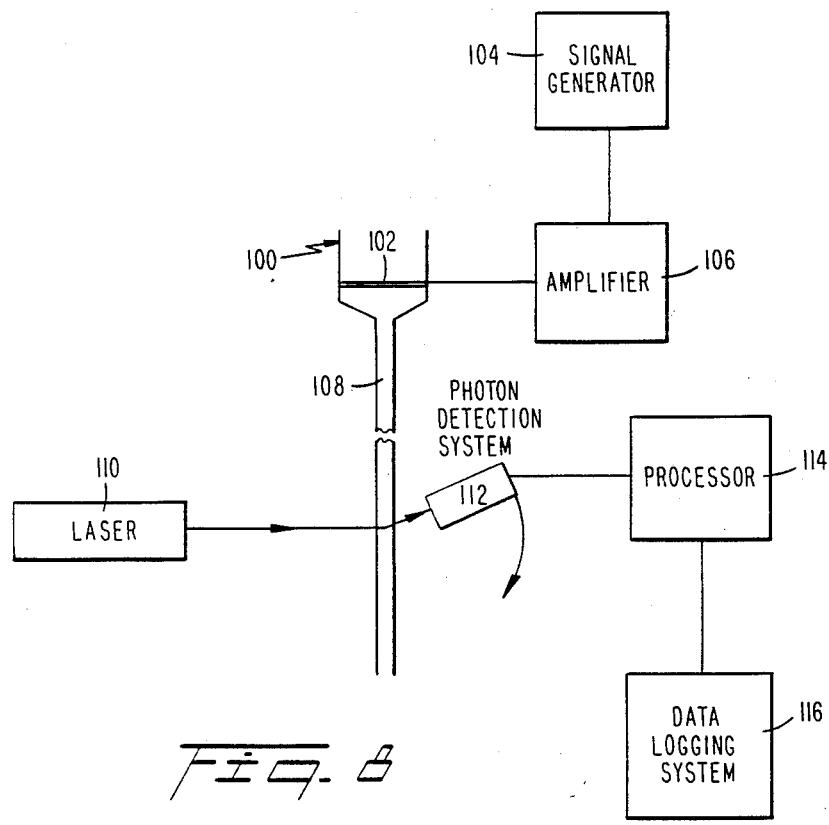

FIG. 3 is a plan view of one example of a filter element for use in the apparatus of FIG. 2, FIG. 4 is a perspective view of an alternative example of a filter element for use in the apparatus of FIG. 2, FIG. 5 is a sectional view of filtering apparatus according to a further embodiment of the invention, FIG. 6 is a sectional view of filtering apparatus according to still a further embodiment of the invention, FIG. 7 is a plan view of one example of a filter element for use in the filter means of FIG. 6, and FIG. 8 is a block diagram illustrating one form of the filter method according to the invention.

Figure 1:
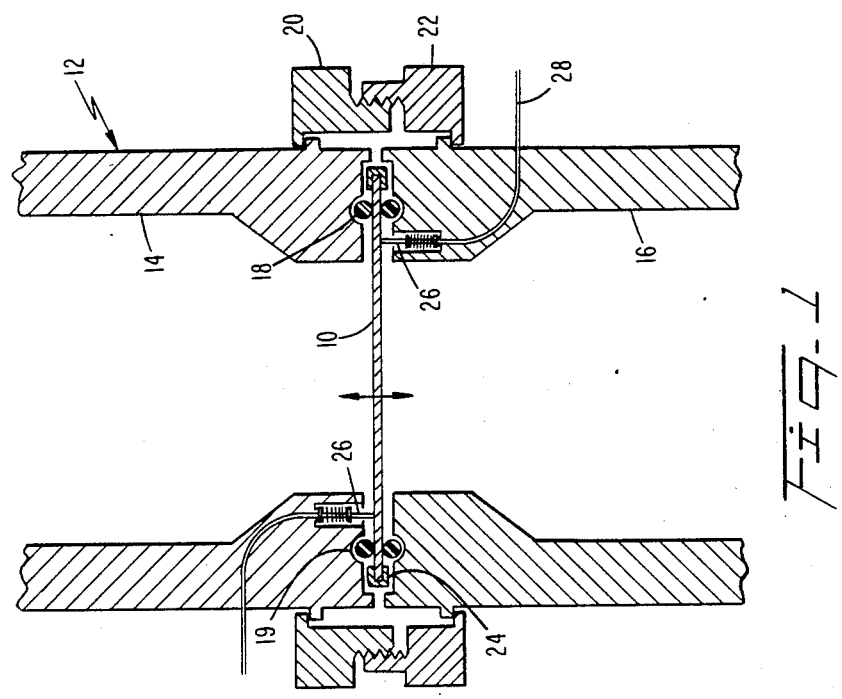
FIG. 1 is a sectional view of filtering apparatus according to this invention.

Referring to FIG. 1, the filter means according to this invention comprises a disc 10 of lead zirconate titanate (PZT) which is suitably supported in a housing shown generally at 12. The disc 10 typically has a diameter of 1 to 2 cm and a thickness of 0.1 to 0.2 mm. The disc is formed by sintering in such a manner as to produce pores in the disc with the pore size being in a typical example 10 microns.

The housing 12 is formed of cylindrical inflow and outflow parts 14 and 16 respectively. The opposing faces of these parts are cut away to form an annular recess 16 and the disc 10 is trapped in this recess between two O-rings 18. Each of these O-rings is accommodated in a circular groove 19 in the corresponding housing part. A locking collar having threaded portions 20 and 22 holds the housing parts together and applies sufficient compression to the O-rings 18 to produce a fluid seal. For further sealing protection, the disc 10 is provided with a peripheral seal element 24.

Both circular faces of the disc are provided with electrodes (not shown) of, for example, gold or platinum. These electrodes are arranged only partially to cover the disc surface so as not to prevent passage of filtrate through the disc. Partial coverage may be achieved by depositing electrode material in a pattern or by depositing the electrode material only very weakly so that the electrode is porous on a microscale. Electrical connection to the electrodes is made through spring biased pins 26 mounted in the respective housing parts and connected with electrode leads 28.

The disc 10 is poled in the axial direction in such a manner that under the action of a field applied through the electrodes, the disc is subject to radial strain. In the conventional terminology, the disc is therefore a radial expander. One of the electrodes is connected directly to earth and the other electrode is connected to the output of a power amplifier which receives in turn a suitable input from a function generator. The amplifier is arranged to supply a voltage to the electrode which is preferably in the range of 100 millivolts to 5 volts. The wave form generated in the function generator may be sinusoidal or may take other forms. The function generator may be programmed so as to produce substantially constant low amplitude vibration in the disc with intermittent bursts of high amplitude vibration. The function generator may also be arranged to apply a DC bias to the disc so that the upper surface (which is the surface facing the sample to be filtered) is negatively charged.

Refering now to FIG. 2, a filter element shown generally at 30 is mounted in an annular recess 32 formed between cylindrical housing parts 34 and 36 which engage through a screw thread 38. In one form, the filter element, as shown in FIG. 3, comprises an annular piezoelectric element 40 bonded to and surrounding a filter membrane 42 of otherwise conventional form. The piezoelectric element 40 may comprise a toroid of PZT or other ceramic piezoelectric material. Alternatively, a planar skirt of polymeric piezoelectric material such as polyvinylidene fluoride may be used. An O-ring 44 serves to ensure a fluid tight seal between the filter element and each housing part. Suitable electrodes (which need not be porous) are provided on the piezoelectric element and electrical connection is made to those electrodes through electrode leads 46.

It will be understood in this embodiment that the element which serves as the filter does not itself show a piezoelectric effect but is intimately bonded to a body of piezoelectric material. By suitable excitation of the piezoelectric element, vibrations may be established in the filtering material.

In a modification which is illustrated in FIG. 4, the piezoelectric element comprises a disc 50 which is arranged to be highly porous and which serves as the backing for an otherwise conventional filter membrane 52. The disc 50 may for example be formed of PZT material sintered in such a way as to provide pores of large diameter. Alternatively, a highly porous polyvinylfluridene membrane may be used. The filter membrane 52 is bonded to the backing disc 50 so that vibrations established in the backing disc are mechanically transmitted to the filtering material.

A further embodiment of this invention is illustrated in FIG. 5. A filter disc 60 is mounted in a filter housing 61 which provides a filtrate outlet 62. The housing 61 is suspended through a flexible bellows 64 from a rigid cylindrical inlet 66. A drive pin 68 engages one point on the periphery of the filter housing 61, this drive pin forming an extension of an armature 70 in a solenoid coil 72.

A signal generator 74 provides a periodic output which is amplified in amplifier 76 and applied to the solenoid. In this way, the armature and drive pin 68 are caused to oscillate longitudinally and the filter element 60 is vibrated in the radial direction.

A still further embodiment of the invention is illustrated in FIGS. 6 and 7. Here, the filter element 80 comprises a filter membrane 82 which is carried on a flexible support membrane 84 of a elastomeric material. Two ferromagnetic pole pieces 86 are bonded to the filter element one each side of the filter membrane.

The filter element is carried in a housing generally similar to that shown in FIG. 5 with the exception that the filter housing in FIG. 6 is rigidly supported. Instead of a direct mechanical connection to the filter housing 81, a pair of field coils 88 are provided at diametrically opposed locations. A suitable excitation voltage is applied to the field coils to establish an oscillating magnetic field. The action of that field on the ferromagnetic pole pieces 86 establishes bodily vibration of the filter membrane 82 in the radial direction. The movement of the filter body is accommodated by the resilience of the support membrane 84.

Referring now to FIG. 8, there is shown filtering apparatus according to this invention by which the filtration process can be monitored and parameters such as the vibration of the filter body controlled in feedback.

A filter assembly is shown diagrammatically at 100, the filter element 102 being excited by a voltage from signal generator 104 amplified in amplifier 106. The filtrate passing through outlet tube 108 is monitored by an arrangement comprising a laser 110 and photon detection system 112. Such systems for detecting light scattered by suspended particles are well known to the skilled man and it is felt that detailed description here is not necessary. The output of the photon detection system is fed to a processor 114 which is supported by a data logging system 116. If the size distribution or concentration of particular species in the filtrate departs from expected levels, the filtration process can be controlled in a feedback loop. For example, the processor 114 can be connected as shown to the signal generator 104 so as to vary the frequency or amplitude of vibration. As described above, the frequency of vibration can be increased to exhibit selectivity in favour of faster moving species. Alternatively, the filter body can be vibrated to reduce fouling to that necessary to produce the required activity. In a still further alternative, the surface charge applied to the filter element can be varied to alter the electrostatic repulsion of charged species.

It should be understood that this invention has been described by way of examples only and a variety of other modification are possible without departing from the scope of the invention. Thus, an arrangement similar to that of FIG. 1 may be used with a polymer piezoelectric material and the electrodes may conveniently be rendered porous using the same techniques as described for producing porous polymers. It will be understood that other electrode structures may be employed and that the electrode may, in the case of highly conductive filtrates, be required to be insulated. In the case of a filter body of magnetostrictive material, a magnetic field can be applied in a great variety of ways which will be evident to those skilled in the art.

It will be understood from the above examples that the vibration applied to the filter body can be applied mechanically, electromechanically, through use of electro or magneto-restrictive materials, through the use of piezoelectric materials or in still further ways which will suggest themselves to the skilled man. In the preferred form, the filter body is itself formed of the piezoelectric material or comprises a porous material formed integrally with a drive element of piezoelectric or magneto-restrictive material. This is not to say, however, that other drive techniques are excluded and indeed examples of such other techniques have been described above.

The filter body can be made to follow a directly applied voltage wave form or can be excited to resonance. The resonant frequency will depend on the mechanical design and in a particular apparatus, the resonant frequency can be modified in controlled fashion by, for example, using further piezoelectric elements to distort support structures in the apparatus.

Whilst the above examples relate specifically to filtering apparatus of cylindrical geometry, the invention is not to be regarded as so restricted. The invention can, for example, be applied to cross-flow filtration methods. Relatively thin flow channels can be established across the filter membrane in a cell and either the whole membrane moved with respect to the cell or each channel being provided with a separate means of driving vibration. With reference to the preferred use of piezoelectric materials, it will be recognised that the poling of the piezoelectric material is selected to produce the required motion. Thickness and radial/length expanders are commercially available and flexing elements produced by lamination can also be used. The described use of backing plates represents one example of such a technique. It should also be noted that various motions can be achieved by constructing filter bodies of multiple piezoelectrics with different polings and mounting directions, for example, perpendicular and lateral movement in sequentially applied layers of the same filter body. In order to achieve the selectivity affect related to said described factor, it is necessary to produce vibration in a direction lying in the surface plane of the filter body. Where the intention is primarily to reduce or control fouling, vibration in other senses can be used and, in particular, perpendicular and flexure motions are thought to be useful.

We claim:

1. A method for selective filtering of a fluid containing at least two distinct species of microorganisms or macromolecule, comprising the steps of providing a filter body having a planar surface opposing the fluid, the body being formed of porous piezoelectric material, the pores of which provide filtrate passages extending through the body, which filtrate passages are capable statically of passing both said species; continuously applying an oscillating electric field to said body to vibrate the body and effect a displacement in the plane of said planar surface, said displacement having an amplitude between about 0.5 and 10 times the mean dimension of the pores in said plane; and varying the frequency of said oscillating field and thus of said displacement selectively to either pass both said species or block one and pass the other of said species.

2. A method according to claim 1, further comprising the steps of continuously monitoring the respective amounts of said two species passing through the filter body and continuously controlling the frequency of said oscillating field in response to said monitoring.

3. A method according to claim 1, further comprising the steps of monitoring the amount of a first species of said at least two distinct species passing through the filter body; increasing in feedback the frequency of said oscillating field to a frequency level at which said amount of the first species falls substantially to zero, and maintaining the frequency of said oscillating field at said frequency level.

* * * * *